Feb. 19, 1946.　　　A. L. LEE　　　2,395,333
MINE TRUCK
Filed Dec. 27, 1943　　　3 Sheets-Sheet 1

INVENTOR;
ARTHUR L. LEE,
BY Chas. M. Niesen,
ATT'Y.

INVENTOR:
ARTHUR L. LEE,
BY Chas. M. Nissen,
ATT'Y.

Patented Feb. 19, 1946

2,395,333

UNITED STATES PATENT OFFICE 2,395,333

MINE TRUCK

Arthur L. Lee, Upper Arlington, Ohio, assignor to The Jeffrey Manufacturing Company, a corporation of Ohio Application December 27, 1943, Serial No. 515,679

21 Claims. (Cl. 180—43)

This invention relates to a mine truck which may be used to support any one of a variety of bodies or loads, examples of which are mining machines, loading machines and shuttle cars used in underground coal mines.

An object of the invention is to provide an improved truck, the main frame of which has a very low height and in which the drive gearing is compactly arranged while being adequately protected.

A further object of the invention is to provide novel arrangements of parts in a vehicle of the above mentioned type in which all of the wheels are driven and are steerable.

Another object of the invention is to provide an improved power driven steering or steerable vehicle wheel assembly.

Still another object of the invention is to provide improved apparatus for supporting a vehicle wheel.

A further object of the invention is to provide improved driving mechanism for a power driven steering wheel employing a floating drive shaft along the steering axis.

Still another object of the invention is to provide a totally enclosing supporting mechanism for a power driven steering wheel in which the various bearings are all lubricated from a common source.

Other objects of the invention will appear hereinafter, the novel features and combinations being set forth in the appended claims.

Figure 1:
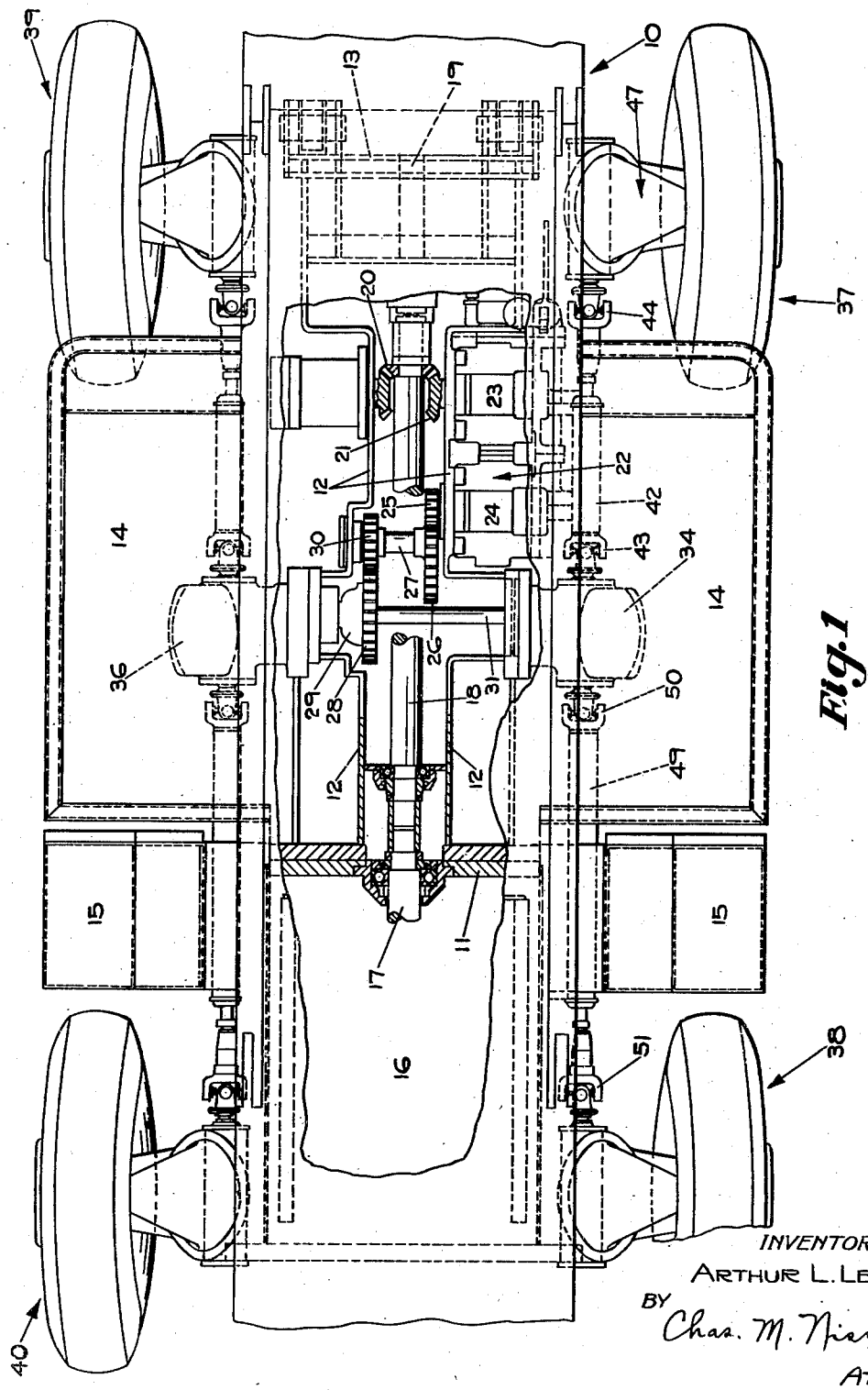
Fig. 1 is a plan view with parts broken away and with parts omitted, showing a truck incorporating the features of my invention.

Referring particularly to Fig. 1 of the drawings, the truck of my invention includes a main frame 10 which preferably has a minimum overall height consistent with adequate clearance to operate in a coal mine. The main frame 10 is built up of a plurality of interconnected parts and includes a casing or housing of a motor 16 which forms the rear portion thereof. The forward plate 11 of the motor 16 is rigidly connected to the cross-plate of a forward frame member 12 which extends to the front of the truck and is provided with a pivotal connection for a front axle 13 pivotally attached to the front end of said frame member 12 about a horizontal axis by pin 19. The front axle 13 may be considered a part of the main frame 10.

Extending laterally from the sides of the main frame 10 are combination supports and wheel guards 14, 14 to the rear of which are control boxes 15, 15. The motor 16 has an armature shaft 17 which is coupled to a longitudinally extending drive shaft 18 which is positioned between and housed within the frame member 12 and substantially centrally of the main frame 10.

Adjacent its forward end the drive shaft 18 is provided with a bevel pinion 20 which meshes with and drives the bevel pinion 21 of a transmission mechanism 22 which is preferably of the hydraulic type including a hydraulic pump 23 and a hydraulic motor 24. This transmission mechanism 22 may be of other construction, but that diagrammatically illustrated and which I prefer to employ, follows the structure disclosed in the application of Sterling C. Moon, entitled Truck and hydraulic transmission, Serial No. 554,125, filed Sept. 14, 1944.

Insofar as it is an essential part of this invention it may be stated that the transmission mechanism 22 includes a pinion 25 which is on the shaft of hydraulic motor 24 and which meshes with a large gear 26 on shaft 27 which drives the master gear 28 of a differential mechanism 29 through a pinion or spur gear 30. The differential mechanism 29 drives a pair of shafts which extend from opposite sides thereof, one of which is seen at 31. The shaft 31 is splined to a bevel pinion 32 (see Fig. 3) which is mounted in spaced anti-friction bearings in a differential housing 33 within which there is a differential 34 having a master ring gear 35 which meshes with and is driven by the pinion 32.

It may be further stated that on the opposite side of the main frame 10 from that where differential 34 and housing 33 are located, there is a similar differential and housing designated generally 36 and the differential thereof is driven by the other shaft which extends laterally from differential 29, being complementary to shaft 31. In other words, there are two shafts, one of which is seen at 31, which extend laterally of the main frame 10 and which are driven by the master gear 28 through differential 29. The shaft 31 drives a gear train which extends forwardly and rearwardly on one side of the main frame 10 through differential 34 to drive the forward and rearward wheel assemblies 37 and 38, respectively. This gear train will be traced hereinafter.

Likewise, the shaft which is complementary to shaft 31 drives gear trains which extend forwardly and rearwardly on the opposite side of the main frame 10 and drive the forward and rearward wheel assemblies 39 and 40, respectively, through differential mechanism 36.

Figure 3:
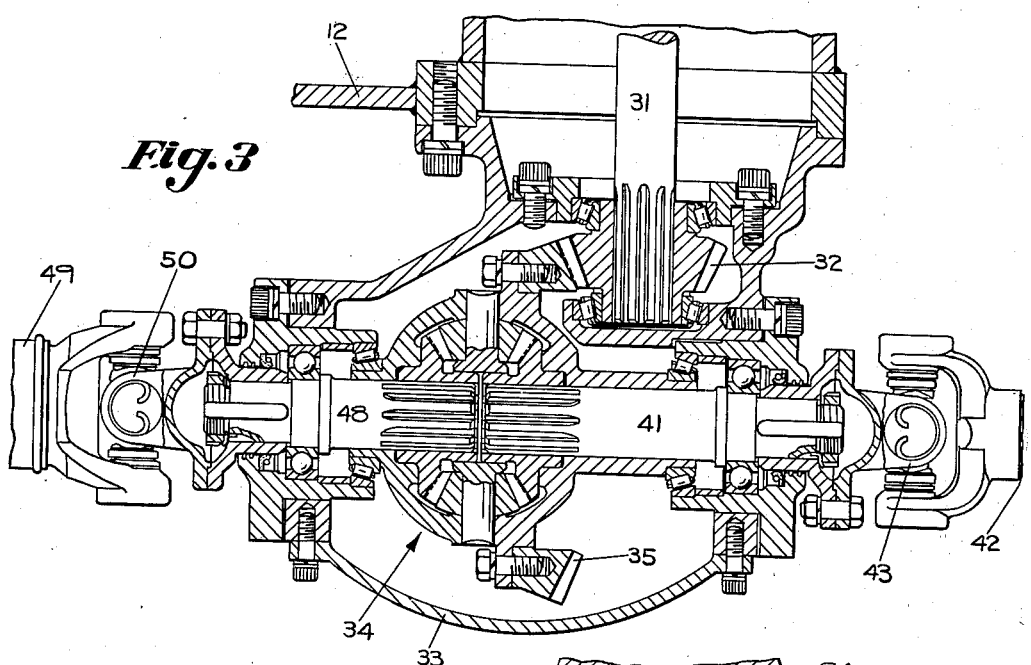
Fig. 3 is a sectional plan view of the drive gear on one side of the truck.

Considering now particularly Figs. 1 and 3 of the drawings and the gear trains which extend from the differential 34 to the wheel assemblies 37 and 38, it will be seen by reference particularly to Fig. 3 of the drawings that associated with the differential 34 is a forwardly extending stub shaft 41 which drives a forwardly extending drive shaft 42 (see Fig. 1) through a universal joint 43. The forward end of shaft 42 is connected by a universal joint 44 (see Figs. 1 and 4) to a stub shaft 45 (see Fig. 4) which is splined to the interior of a bevel gear 92 independently mounted on spaced anti-friction bearings in the bottom of a supporting bracket or housing 47 which is described in more detail hereinafter.

Reverting to Fig. 3 of the drawings, it will be seen that a stub shaft 48 extends rearwardly from the differential 34 and is connected to a drive shaft 49 (see Fig. 1) through a universal joint 50. At the rear end of the drive shaft 49 is another universal joint 51 which is connected to drive the wheel assembly 38. Since the wheel assemblies 37, 38, 39 and 40 are of similar construction, adequate provision being made for their locations at the four corners of the main frame 10, a description of wheel assembly 37 will suffice for all of them.

As a general statement, it may be stated that the wheel assemblies 37, 38, 39 and 40 are all power driven and preferably are all steerable. In the interest of clearness the steering mechanism or, in other words, the mechanism for swinging the wheels about their steering axes, is not illustrated since per se it forms no part of this invention. Any conventional steering mechanism, as commonly employed on automobiles, trucks or the like, may be employed.

Referring particularly to Fig. 1 of the drawings and to the mechanism which has so far been described, it is, of course, understood that the drive mechanism from the motor 16 is substantially duplicated on each side of the main frame 10 and that, from the differentials 34 and 36 drive shafts which are differentially driven in each instance extend forwardly and rearwardly to drive the appropriate wheel assemblies 37, 38, 39 and 40.

It is to be noted that the differential mechanisms 34 and 36 are located outside the main frame 10 and closely adjacent to it, so that the drive shafts such as the drive shafts 42 and 49 and the equivalent drive shafts on the opposite sides of the vehicle or truck are closely adjacent the main frame 10, thus being no more exposed than is necessary. However, by placing them outside the main frame 10, they are accessible for repair and inspection and make available more space within the extreme lateral dimensions of said main frame 10 for important operating mechanism, much of which is not illustrated in the drawings.

Figure 2:
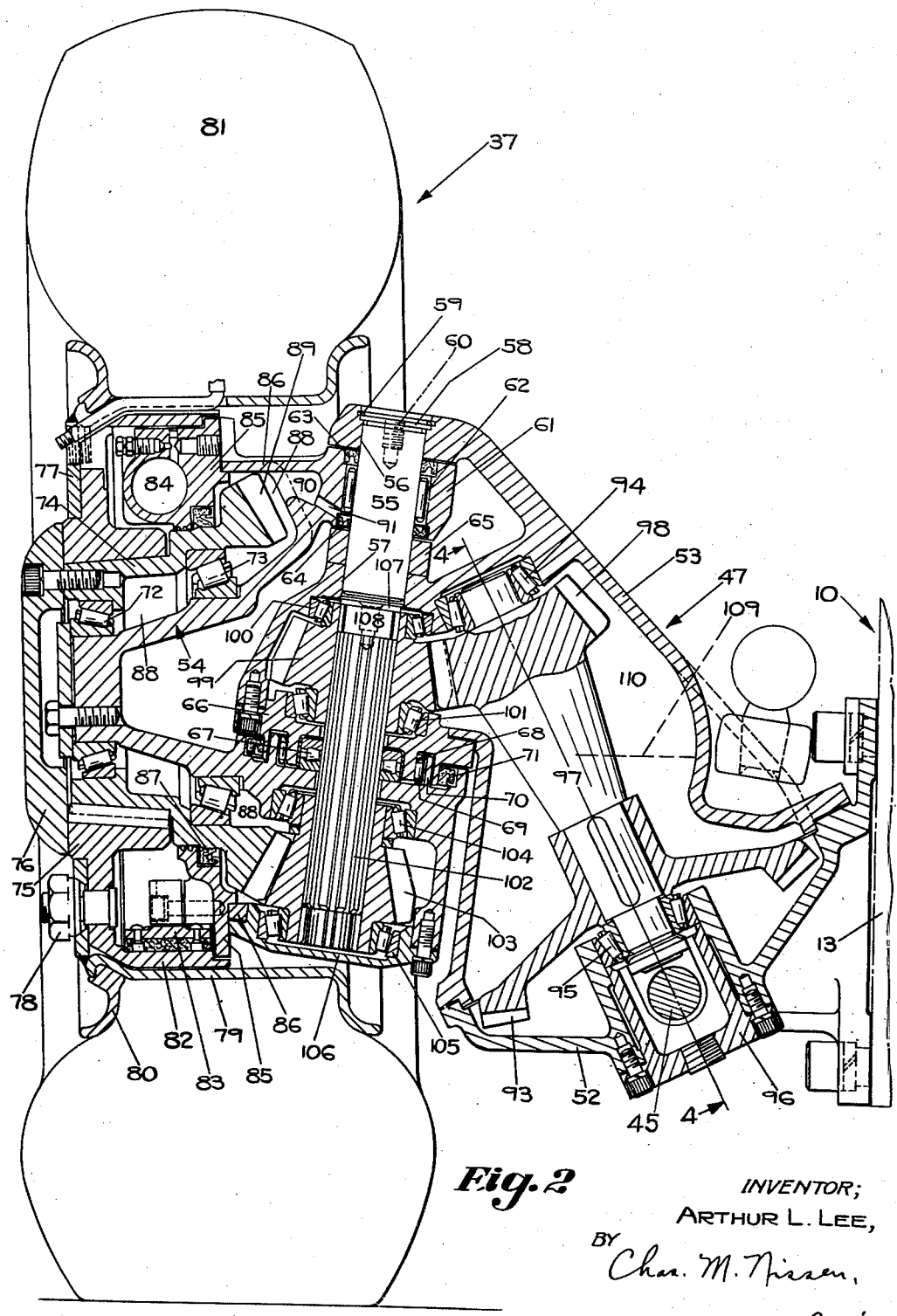
Fig. 2 is a sectional elevational view of one of the wheel assemblies.
Figure 4:
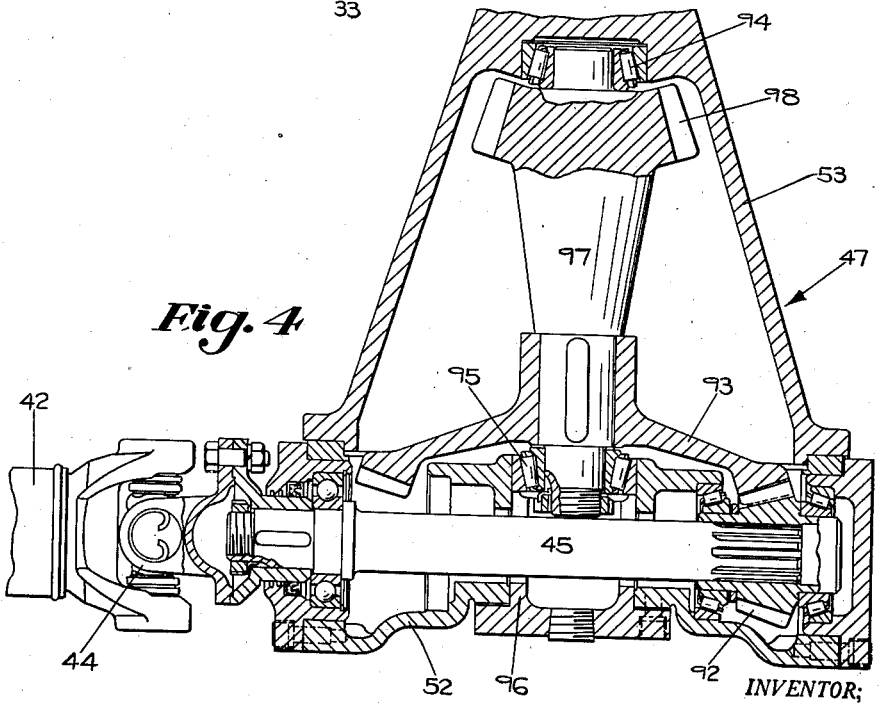
Fig. 4 is a sectional view taken on the line 4—4 of Fig. 2, looking in the direction of the arrows.

Attention is directed now particularly to Figs. 2 and 4 of the drawings and to the construction of the wheel assembly 37. The supporting bracket or housing 47 is formed by a base casting or member 52 which is rigidly bolted or otherwise attached to the front axle 13 of the main frame 10 as illustrated in Fig. 2 of the drawings. Extending upwardly and sloping outwardly from the base casting 52 is a top casting or member 53, the bottom of which is rigidly bolted to said base casting 52. Thus the two castings 52 and 53 co-operate to provide a totally enclosing housing for elements of a gear train which is described more completely hereinafter and also provide the supporting bracket 47 which forms a part of and acts as the supporting member for the front wheel assembly 37.

Pivotally mounted on the bracket 47 about an upwardly extending but sloping axis which constitutes a steering pivotal axis of the wheel, is a wheel bracket or casing 54. The mechanism which affords the above mentioned pivotal connection between the bracket 47 and the bracket 54 will now be described. Adjacent the upper end of the bracket 47 there is a removable cylindrical pin 55 which extends into close fitting spaced-apart bearing surfaces 56 and 57 formed on spaced-apart elements adjacent the top of said bracket 47 and formed as an integral part of the casting 53. The pin 55 is held in place as illustrated in Fig. 2 of the drawings, by virtue of the fact that it has a small head 58 which fits snugly in a recess in the uppermost portion of bracket 47 and is removably held in place by a snap ring 59 which fits in a groove above said head 58. The upper portion of the pin 55 is provided with a threaded tool receiving bore 60 which provides for its removal. It is obvious that when the pin 55 is in place, as illustrated in Fig. 2, it in effect becomes a bearing member non-rotatably connected to the upper end of bracket 47.

Mounted on the pin 55 for swinging movement about the axis thereof is the upper bearing member 61 of the bracket 54. An anti-friction or needle bearing 62 is imposed between the pin 55 and the bearing member 61, and top and bottom seals 63 and 64 are provided for the bearing 62. Below the bearing member 61 is a collar or spacer 65, the bottom of which rests on a ledge formed on a portion of the top casing 53 adjacent the bearing surface 57. The upper surface of the collar or spacer 65 maintains the upper bearing member 61 of bracket 54 in the position illustrated in Fig. 2, while its removal permits an appreciable amount of downward movement of the bracket 54 with respect to the bracket 47 for a purpose hereinafter described more completely.

To provide a second anti-friction bearing connection between the supporting bracket 47 and the wheel bracket 54 about the pivotal axis above mentioned, I provide structure now to be described. As clearly seen in Fig. 2 of the drawings the top casting or member 53 has a laterally projecting portion which is provided with an opening closed by a removable cap 66, which cap 66 is attached to the casting 53 by a plurality of machine screws. The cap 66 is provided with a central cup which receives an anti-friction thrust bearing 67 which takes the load between the adjacent portion of the wheel bracket 54 and the supporting bracket 47. The axis of the thrust bearing 67 is coincidental with the pivotal axis which is also coincidental with the axis of the pin 55.

Concentric with the above mentioned cup which receives thrust bearing 67, the removable cap 66 is provided with a groove 68 which provides two parallel cylindrical surfaces concentric with the pivotal axis. The cylindrical surface of this groove which is of the smaller diameter, is a bearing surface of the bracket 47 which receives a needle bearing 69 which takes the lateral load between the wheel bracket 54 and the supporting bracket 47. This anti-friction bearing 69 is received in a cup which is formed on the bracket 54 by an integrally formed ring 70 the inner cylindrical surface of which acts as a bearing surface for the bearing 69 and which is concentric with the steering axis. It is obvious that the ring 70 extends into the groove 68, thus providing the aforementioned bearing surface for said bearing 69.

There is also provided between the cap 66 and adjacent portion of the bracket 54 a grease or lubrication seal 71 which fits in a groove formed between overlapping parts of the cap 66 and said bracket or casting 54, as clearly illustrated in Fig. 2 of the drawings.

From the above description it is obvious that the bracket 54 is pivotally connected to the bracket 47 about the pivotal axis which is the axis of the bearings 62, 67 and 69 as well as the axis of the pin 55. The axial thrust bearing 67 and the lateral load carrying bearing 69 co-operate to provide what is in effect a composite lower supporting bearing for the wheel bracket 54, the upper and spaced-apart supporting bearing being the bearing 62. These two spaced-apart bearings provide for adequate transfer of the load on the wheel bracket 54 to the supporting bracket 47.

The function of the previously mentioned collar or spacer 65 is to maintain the co-operating parts of bracket 54 and cap 66 in proper relation so as to maintain proposed bearing surfaces for the bearings 67 and 69. If it is desired to disassemble the parts, the snap ring 59 may be removed and the pin 55 withdrawn by connecting a tool to the bore 60. When this is done, the spacer or collar 65 may be removed. Thereupon, bracket 54 may be moved downwardly with respect to bracket 47 an amount determined by the thickness of collar 65 which is adequate to provide for severance of the overlapping parts of bracket 54 and cap 66.

The wheel bracket 54 carries a pair of spaced anti-friction roller bearings 72 and 73 which support the hub 74 of a wheel 75 for rotation on a substantially horizontal axis. The wheel 75 is keyed to and has a tight fit with the hub 74 to which it is removably connected by a hub cap 76 which has a plurality of machine screws threaded into the hub 74 as clearly illustrated in Fig. 2 of the drawings. The wheel also includes a removable connecting ring 77 which is connected to the wheel part 75 by removable lugs 78. Rigidly attached to and forming part of the ring 77 is a wheel rim 79 provided with a removable split bead ring 80 which co-operates to maintain the pneumatic tire 81 on said rim 79. The rim 79 extends inwardly from the ring 77 and provides with the wheel parts 75 and 77 a cylindrical housing which is open on the inside. It is to be understood, of course, that the rim 79 is in effect a part of the wheel and may be considered as defining the lateral or axial and radial or circumferential confines of said wheel.

The wheel part 75 includes an inwardly formed brake drum 82 with which brake mechanism including one or more brake shoes 83 co-operate. The brake mechanism also includes hydraulic actuating mechanism 84. The brake mechanism including the hydraulic actuating mechanism 84 and the brake shoes 83 are mounted on a supporting ring 85 which is rigidly attached to and forms a part of the wheel bracket 54.

The wheel bracket 54 also includes a gear and lubrication housing which is formed between the external surface of the central conical portion thereof, as viewed in Fig. 2 of the drawings, and a radially spaced circumferential housing or wall 86, to which wall 86 the aforedescribed ring 85 is attached. This lubricating housing is continued by the hub 74 and the hub cap 76 so that the bearings 72 and 73 are contained within the enclosing housing which carries lubricating oil or grease. It is, of course, obvious that the hub 74 of the wheel rotates and thus to provide a seal between the outer wall 86 and more specifically the ring 85 of this housing, there is a large grease or lubricating seal 87 between the hub 74 and the ring 85, said seal being carried in a groove in said ring 85.

This compartment which houses the bearings 72 and 73 is designated generally by the reference character 88 and as clearly illustrated in Fig. 2 of the drawings it is formed by the central conical portion of bracket 54, the outer circumferential wall 86, the ring 85, the hub 74 and the hub cap 76. Within this compartment 88 and formed integrally with the hub 74 is a bevel ring gear 89 which is the final driving gear in a gear train which extends from the previously mentioned motor 16 to the wheel 74—81. It is obvious that this ring gear 89 will be lubricated by lubricating oil or grease within the compartment 88.

It is further to be noted that adjacent the top of the compartment 88 there is a small well or sump 90 which will gather lubricating oil or grease elevated by the gear 89, and a bore 91 in the bearing member 61 of bracket 54 will conduct this lubricating fluid to the top bearing 62. Thus the top bearing 62 is lubricated by the oil within compartment 88 and it may be stated this oil is delivered to compartment 88 over a path hereinafter described, from the enclosing housing provided by bracket 47, so that lubricating oil delivered to the reservoir or sump formed in the bottom of bracket 47 will lubricate all of the bearing surfaces associated with the wheel assembly 37, including both the anti-friction bearings and the gears.

Attention is now directed to the extension of the gear train from the shaft 45 (see Fig. 4) to which it was traced from motor 16 to the wheel 74—81. Mounted in the base casting 52 upon spaced anti-friction bearings is a pinion 92 which is connected by a splined connection to the stub shaft 45. It is evident that the mounting of pinion 92 is entirely independent of the shaft 45 though they are positively connected for driving or power transmission. The pinion 92 meshes with a large bevel gear 93 (see Figs. 2 and 4), which is keyed to shaft 97 mounted at its top and bottom in spaced anti-friction bearings 94 and 95, the former being carried in a cup formed in the top of casting 53 of bracket 47, the latter being carried in a cup in casting 52 of bracket 47. A removably adjustable sleeve 96 provides for adjustment of the bearings 94 and 95 by co-operating with the latter. Said sleeve 96 extends into the above-mentioned cup which receives bearing 95 and is held to casting 52 by screws in the head thereof, as clearly illustrated in Fig. 2 of the drawings. Shims may be interposed between said head and said casting 52 to adjust the bearings 94 and 95.

At its upper end shaft 97 is provided with an integrally formed bevel pinion gear 98 which meshes with a pinion gear 99 mounted in upper and lower anti-friction roller bearings 100 and 101 supported respectively in an upper cup formed in casting 53 of bracket 47 and a lower cup formed in removable cap 66 forming a part of said bracket 47. It is to be noted particularly that the pinion gear 99 is thus supported for free rotation in the bracket 47. Furthermore, the axis of the gear 99 is along the steering axis of the wheel assembly and thus in alinement with the axis of the removable pin 55.

The pinion 99 has a splined connection with a splined drive shaft 102 and preferably has a relatively loose, though positive, driving connection therewith. The splined drive shaft 102 has its axis along the steering axis and it extends through the previously mentioned bearings 67 and 69, and in contact with the former. It also extends downwardly through an opening in the wheel supporting bracket 54 and into a pinion gear 103 with which it also has a loose splined connection providing a positive drive.

The pinion gear 103 is mounted in upper and lower anti-friction bearings 104 and 105, the former being in a cup in the casting or bracket 54, the latter being in a removable cap 106 which is attached to bracket 54 and forms a part thereof and of the oil compartment or housing 88. Cap 106 is attached to said casting 54 and more particularly to a bottom portion of the wall 86 thereof by means of a plurality of peripheral screws, one of which is seen in Fig. 2 of the drawings.

It is thus to be particularly noted that the pinion gear 103 is mounted in the wheel supporting casting 54 entirely independently of the splined drive shaft 102. In other words, it is to be noted that of the two pivotally connected brackets 47 and 54, the former is provided with pinion 99 which is mounted in it on anti-friction bearings independently of the splined drive shaft 102 and the latter is provided with the pinion 103 which is mounted in it on anti-friction bearings independently of said shaft 102. The splined shaft 102 has a positive driving connection with each of the pinions 99 and 103 but it fits loosely with each so that absolute alinement between the axes of the pinions 99 and 103 is not essential and no shaft alinement strain will be placed upon the bearings of said pinions. It may be further pointed out that the shaft 102 is provided with a small head 107 which rests on top of the pinion 99 and thus holds it in place against downward movement as illustrated in Fig. 2 of the drawings.

This relation of gears 99 and 103 and shaft 102 is very important. In the first place, it is very desirable that meshing gears 103 and 89, which are preferably precision spiral bevel gears, when once assembled will not be affected by disassembly of the bracket 54 and parts carried by it from bracket 47. Likewise, it is very desirable that meshing gears 98 and 99, which are also preferably precision spiral bevel gears, when once assembled may not be affected by said disassembly of brackets 54 and 47. The construction provided has these desirable characteristics. That is, when pin 55 and shaft 102 are removed and brackets 47 and 54 and their respective associated parts are disassembled, it is obvious that the meshing relation between gears 89 and 103 in housing 54 is not disturbed. Likewise, when these brackets 47 and 54 are disassembled, the meshing relation between gears 98 and 99 in housing 47 is not disturbed. In fact, the disassembly mentioned is effective without disturbing the meshing relation of any gears. Only the loose fitting but positive driving relation between shaft 102 and the gears 99 and 103 in the gear train is disconnected by the mentioned disassembly.

The upper end of the shaft 102 is provided with a threaded tool receiving bore 108 to provide for its removal, and the maximum diameter of the shaft 102 which is found in the head 107, is less than the diameter of the pin 55 so that after pin 55 has been removed a tool may be threaded into the bore 108, and the shaft 102 removed. It is, of course, obvious that the shaft 102 and the pin 55 are in alinement along the steering axis, and the steering axis together with the axis of the shaft 97 preferably lie in a substantially vertical plane which extends transversely of the main frame 10. The axis of the shaft 97 slopes outwardly as viewed from the bottom in this vertical plane, and the axis of the shaft 102 or, in other words, the steering axis slopes inwardly as viewed from the bottom in this vertical plane and is near the center of the tire, thus reducing turning torque. In other words, these two axes will intersect in a vertical transverse plane somewhere above the shafts 97 and 102.

The pinion 103 meshes with and drives the previously described ring gear 89 and thus drives the wheel 74—81 about its generally horizontal axis which is the axis of the bearings 72 and 73. This horizontal axis also preferably passes through the above-mentioned vertical plane.

From the above description it is obvious that the wheel assembly 37 is power driven from the motor 16 as is each of the other wheel assemblies 38, 39 and 40, and furthermore that each of said wheel assemblies is steerable about an upwardly extending inclined axis. Differential drives are provided so that each wheel may have a differential action with respect to each other wheel. Furthermore, the drive gearing is protected to the greatest extent possible and in each instance the drive gearing within the wheel assembly itself is completely enclosed, and all bearing surfaces of the drive gearing and the anti-friction bearings are lubricated from a common source. This common lubricating source and the lubricating passageways which make for this simple fool-proof and highly effective lubrication, will now be described.

The housing provided by the bracket 47 forms an oil sump or reservoir in its bottom so that oil may be filled to the level indicated at 109 in Fig. 2 of the drawings. The housing 47 is provided with oil, grease or lubricating filling and level testing openings, not shown, so that it may be filled with oil, grease or other lubricant to any desired level, the preferred level being indicated at 109 as above mentioned. It is thus evident that the gears and bearings in the bottom of this housing or bracket 47 will be covered with oil. By splash or capillary or other action, such as the movement of gears, the oil will reach the bearings 94, 100 and 101 and the gears 98 and 99 which are in the same enclosing compartment 110 as the lubricating fluid.

Furthermore, the splines in the shaft 102 will provide communicating passageways between the compartment 110 of bracket 47 and the compartment 88 of bracket 54 and the grease seal 71 will prevent loss of this lubricating fluid while passing along the splines of said shaft 102. At the same time this lubricating oil passing along said splines will lubricate the anti-friction bearings 67 and 69. The lubricating oil or grease in the compartment 88 will, of course, lubricate all of the bearing surfaces on gears or anti-friction bearings therein, including gears 89 and 103 and bearings 72, 73, 104 and 105 and in addition will feed the well or sump 90 to lubricate the bearing 62.

In the operation of the device it is evident that power from the motor 16 will drive the four wheels 37, 38, 39 and 40 each by way of differential action. In addition to the fact that the four wheels are driven, they are all steerable about upwardly extending steering axes. Furthermore, the position of connection of each wheel assembly to the main frame 10 is at a low position so that the overall height of the main frame 10 may be maintained at a minimum consistent with adequate clearance. The wheels are freely steerable about their steering axes by mechanism not illustrated but well known in the art. The pivotal connection between the wheel bracket 54 and the supporting bracket 47 is about spaced upper and lower bearing assemblies which are, generally speaking, toward the top of the bracket 47, though the bottom bearing assembly is substantially midway between the uppermost and lowermost parts of said bracket.

It is further to be noted that the shaft 102 is floating and it constitutes a driving connection which extends between the stationary supporting bracket 47 and the swingable wheel bracket 54. It may also be pointed out that the final driving ring gear 89 in the gear train from motor 16 to the wheel 74—81 is within both the radial and lateral or axial confines of said wheel, and the pinions 99, 103 and shaft 102 are within the radial confines of said wheel. Pinion 103 is largely within the axial or lateral confines of said wheel considering said axial or lateral confines as determined by the axial or lateral dimensions of the rim 79 and ring 80, and the pinion 99 and axle 102 are partially within the lateral or axial confines of said wheel. This, of course, makes for great protection of these elements of the gear train.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A wheel assembly including a supporting bracket, a wheel bracket mounted thereon for pivotal movement about an upwardly extending steering axis, spaced upper and lower bearing means providing the aforesaid pivotal mounting, a wheel mounted on said wheel bracket for rotation about a substantially horizontal axis, a gear train for supplying power to said wheel including a drive shaft having its axis along said upwardly extending steering axis, said drive shaft extending above and below and through the aforementioned lower bearing means, and driving gears on opposite ends of said drive shaft and on opposite sides of said lower bearing means, said drive shaft having a loose driving connection with said driving gears, one of said driving gears being mounted for rotation on said supporting bracket, the other being mounted for rotation on said wheel bracket.

2. A wheel assembly including a supporting bracket, a wheel bracket mounted thereon for pivotal movement about an upwardly extending steering axis, spaced upper and lower bearing means providing the aforesaid pivotal mounting, a wheel mounted on said wheel bracket for rotation about a substantially horizontal axis, a gear train for supplying power to said wheel including a drive shaft having its axis along said upwardly extending steering axis, said drive shaft extending above and below and through the aforementioned lower bearing means, and driving gears on opposite ends of said drive shaft and on opposite sides of said lower bearing means, one of said driving gears being mounted for rotation on said supporting bracket, the other being mounted for rotation on said wheel bracket.

3. A wheel assembly including a supporting bracket, a wheel bracket mounted thereon for pivotal movement about an upwardly extending steering axis, spaced upper and lower bearing means providing the aforesaid pivotal mounting, a wheel mounted on said wheel bracket for rotation about a substantially horizontal axis, a gear train for supplying power to said wheel including a drive shaft having its axis along said upwardly extending steering axis, said drive shaft extending above and below and through the aforementioned lower bearing means, and driving gears on opposite ends of said drive shaft and on opposite sides of said lower bearing means, said drive shaft having a loose driving connection with said driving gears.

4. A wheel assembly including a supporting bracket, a wheel bracket mounted thereon for pivotal movement about an upwardly extending steering axis, spaced upper and lower bearing means providing the aforesaid pivotal mounting, a wheel mounted on said wheel bracket for rotation about a substantially horizontal axis, a gear train for supplying power to said wheel including a drive shaft having its axis along said upwardly extending steering axis, said drive shaft extending above and below and through the aforementioned lower bearing means, and driving gears on opposite ends of said drive shaft and on opposite sides of said lower bearing means.

5. In a wheel structure, the combination with a supporting bracket, of a wheel bracket, means pivotally connecting said brackets for steering adjustment about a steering axis, a wheel mounted for rotation on said wheel bracket, a gear train driving said wheel including a pair of gears mounted on a common axis which is in alignment with said steering axis, one of said gears being mounted on said supporting bracket, the other gear being mounted on said wheel bracket, and a shaft providing a driving connection between said two gears and removable while said two gears are assembled in their respective brackets.

6. In a wheel structure, the combination with a supporting bracket, of a separable wheel bracket, means pivotally connecting said brackets for steering adjustment about a steering axis and providing for their disassembly, a wheel mounted for rotation on said wheel bracket, a gear train for driving said wheel including a pair of gears mounted on a common axis, one of said gears being mounted on said supporting bracket, another gear mounted on said supporting bracket and meshing with said one gear both while said two brackets are assembled and disassembled, the other of said pair of gears being mounted on said wheel bracket, another gear mounted on said wheel bracket and also meshing with the other of said pair of gears both while said two brackets are assembled and disassembled, and a disconnectable shaft providing a driving connection between said two gears.

7. In a wheel structure, the combination with a supporting bracket, of a wheel bracket, means pivotally connecting said brackets for steering adjustment about a steering axis, a wheel mounted for rotation on said wheel bracket, a gear train driving said wheel including a pair of gears mounted on a common axis, one of said gears being mounted on said supporting bracket, the other gear being mounted on said wheel bracket, and a shaft providing a loose driving connection between said two gears, said shaft having a loose splined connection with one of said gears.

8. In a wheel structure, the combination with a supporting bracket, of a wheel bracket, means pivotally connecting said brackets for steering adjustment about a steering axis, a wheel mounted for rotation on said wheel bracket, a gear train driving said wheel including a pair of gears mounted on a common axis, one of said gears being mounted on said supporting bracket, the other gear being mounted on said wheel bracket, and a shaft providing a loose driving connection between said two gears, said shaft having a loose splined connection with one of said gears and being removable while both gears remain in assembled relation.

9. A power driven steering wheel assembly including an enclosing supporting bracket, an enclosing wheel bracket, spaced bearing means pivotally connecting said brackets about an upwardly extending pivotal axis whereby the load on said wheel bracket is transferred to said supporting bracket through said spaced bearings, a wheel mounted on said wheel bracket for turning movement and co-operating therewith to effect closure of said enclosing wheel bracket, a gear train for driving said wheel including gears in both said enclosing brackets, bearings in said brackets for said gears, and means providing lubricating passageways between said enclosing brackets whereby oil in one will reach the other thereby lubricating said gears and bearings in both brackets from a common source of oil.

10. A power driven steering wheel assembly including an enclosing supporting bracket, an enclosing wheel bracket, spaced bearing means pivotally connecting said brackets about an upwardly extending pivotal axis whereby the load on said wheel bracket is transferred to said supporting bracket through said spaced bearings, a wheel mounted on said wheel bracket for turning movement and co-operating therewith to effect closure of said enclosing wheel bracket, a gear train for driving said wheel including gears in both said enclosing brackets, bearings in said brackets for said gears, and means providing lubricating passageways between said enclosing brackets whereby oil in one will reach the other thereby lubricating said gears and bearings in both brackets from a common source of oil, said lubricating passageways also leading to at least one of said spaced bearing means.

11. A power driven steering wheel assembly including an enclosing supporting bracket, an enclosing wheel bracket, means pivotally connecting said brackets about an upwardly extending pivotal axis, a wheel mounted on said wheel bracket for turning movement and co-operating therewith to effect closure of said enclosing wheel bracket, a gear train for driving said wheel including gears in both said enclosing brackets, bearings in said brackets for said gears, and means providing lubricating passageways between said enclosing brackets whereby oil in one will reach the other thereby lubricating said gears and bearings in both brackets from a common source of oil, said pivotal connecting means for said brackets also including spaced bearings which transfer the load on said wheel bracket to said supporting bracket, said lubricating passageways also leading to both of said spaced bearings.

12. A power driven wheel assembly including a supporting bracket, a wheel bracket, a wheel on said wheel bracket, spaced upper and lower bearing means pivotally connecting said brackets about a pivotal axis, the lower bearing means including a bearing extending between parallel cylindrical surfaces one on one of said brackets, the other on the other, said surfaces being on overlapping cups of said brackets, and a removable spacer between the brackets above said lower bearing means which when in place maintains said cups in overlapping relation and when removed provides for separation of said cups from their overlapping relation and for disassembly of said brackets.

13. A power driven wheel assembly including a supporting bracket and a wheel bracket, means pivotally connecting said brackets, a wheel on said wheel bracket, power means for driving said wheel including a pair of gears having axes aligned with said pivotal axis, a shaft interconnecting said gears, bearing means supporting one of said gears for rotation on said supporting bracket independently of said shaft, bearing means supporting the other of said gears for rotation on said wheel bracket independently of said shaft, and means providing a loose but positive driving connection between said shaft and both of said gears.

14. A power driven wheel assembly including a supporting bracket and a wheel bracket, means pivotally connecting said brackets, a wheel on said wheel bracket, power means for driving said wheel including a pair of gears having axes aligned with said pivotal axis, a shaft interconnecting said gears, bearing means supporting one of said gears for rotation on said supporting bracket independently of said shaft, and bearing means supporting the other of said gears for rotation on said wheel bracket independently of said shaft.

15. In a steering wheel assembly, the combination with a support, of a wheel bracket, a wheel mounted on spaced apart bearings on said wheel bracket, means providing a steering axis pivotal connection between said wheel bracket and said support, said means including upper and lower bearings, and housing and passageway forming means providing a housing and lubrication passageways whereby said wheel bearings and said upper and lower bearings are lubricated by a common lubricant.

16. In a steering wheel assembly, the combination with a support, of a wheel bracket, a wheel mounted on spaced apart bearings on said wheel bracket, means providing a steering axis pivotal connection between said wheel bracket and said support, said means including pivot bearings, and housing and passageway forming means providing a housing and lubrication passageways whereby said wheel bearings and said pivot bearings are lubricated by a common lubricant.

17. A wheel assembly including a supporting bracket having means adjacent its bottom for attachment to a frame, a wheel bracket, a wheel on said wheel bracket, means at the top of said supporting bracket for pivotally connecting it to said wheel bracket along an upwardly and inwardly extending axis, drive gearing for said wheel including a shaft and gearing having axes along said pivotal axis and a shaft and gearing carried by said supporting bracket, said shaft extending upwardly and outwardly, and a drive shaft driven gear driving the lower end of said upwardly and outwardly extending shaft.

18. Drive mechanism including a supporting bracket, a wheel mounted for steering movement on said bracket on an upwardly extending axis, a gear train drive mechanism for said wheel including a shaft extending along a horizontal axis through the bottom of said supporting bracket, the axis of said shaft being substantially parallel to the normal plane of said wheel, and gearing interconnecting said shaft and said wheel including gear and shaft drive mechanism mounted along said upwardly extending steering axis, said interconnecting gearing also including a shaft having upper and lower gears thereon and located in the gear train between said first named shaft and said gear and shaft drive mechanism, said last named shaft being mounted on an upwardly and outwardly sloping axis with the upper gear driving said gear and shaft drive mechanism and the lower gear driven from said first named shaft through additional gearing.

19. Drive mechanism including a supporting bracket, a wheel mounted for steering movement on said bracket on an upwardly extending axis, a gear train drive mechanism for said wheel including a shaft extending along a horizontal axis through the bottom of said supporting bracket, the axis of said shaft being substantially parallel to the normal plane of said wheel, and gearing interconnecting said shaft and said wheel including gear and shaft drive mechanism mounted along said upwardly extending steering axis, said interconnecting gearing also including a shaft having gears thereon and located in the gear train between said first named shaft and said gear and shaft drive mechanism, said last named shaft being mounted with one gear driving said gear and shaft drive mechanism and the other gear driven from said first named shaft through additional gearing.

20. A wheel assembly including a supporting member, a wheel supporting bracket mounted on said member for swinging steering movement about an upwardly and inwardly extending axis, a wheel on said wheel bracket, drive gearing for said wheel having an axis along said steering axis, and gearing driving said drive gearing including upwardly and outwardly extending gearing including a driven gear at the bottom thereof, said last named gearing being mounted on said supporting member.

21. A wheel assembly including a supporting member, a wheel supporting bracket mounted on said member for swinging steering movement about an upwardly and inwardly extending axis, a wheel on said wheel bracket, drive gearing for said wheel having an axis along said steering axis, and gearing driving said drive gearing including upwardly and outwardly extending gearing including a driven gear at the bottom thereof.

ARTHUR L. LEE.